United States Patent
Huang et al.

(10) Patent No.: US 11,117,576 B2
(45) Date of Patent: Sep. 14, 2021

(54) VEHICLE LANE TRACE CONTROL SYSTEM

(71) Applicant: DENSO CORPORATION, Kariya (JP)

(72) Inventors: Minglei Huang, Farmington, MI (US); Yu Yan, Novi, MI (US); Hiroshi Inou, West Bloomfield, MI (US)

(73) Assignee: DENSO CORPORATION, Kariya (JP)

( * ) Notice: Subject to any disclaimer, the term of this patent is extended or adjusted under 35 U.S.C. 154(b) by 282 days.

(21) Appl. No.: 16/266,780

(22) Filed: Feb. 4, 2019

(65) Prior Publication Data
US 2020/0247407 A1   Aug. 6, 2020

(51) Int. Cl.
*B60W 30/12* (2020.01)
*G08G 1/16* (2006.01)
*G01C 21/32* (2006.01)
*G06K 9/00* (2006.01)

(52) U.S. Cl.
CPC .......... *B60W 30/12* (2013.01); *G01C 21/32* (2013.01); *G06K 9/00798* (2013.01); *G08G 1/167* (2013.01); *B60W 2710/207* (2013.01)

(58) Field of Classification Search
CPC .......... B60W 30/12; B60W 2710/207; B60W 30/10; G01C 21/32; G06K 9/00798; G08G 1/167
USPC ........................................................ 701/41
See application file for complete search history.

(56) References Cited

U.S. PATENT DOCUMENTS

| | | |
|---|---|---|
| 5,351,044 A | 9/1994 | Mathur et al. |
| 7,689,321 B2 | 3/2010 | Karlsson |
| 8,676,492 B2 | 3/2014 | Litkouhi et al. |
| 8,706,417 B2 | 4/2014 | Zeng et al. |
| 8,948,954 B1 * | 2/2015 | Ferguson .............. B60W 30/12 701/23 |
| 9,081,385 B1 | 7/2015 | Ferguson et al. |

(Continued)

OTHER PUBLICATIONS

"Mapping and localization using GPS, lane markings and proprioceptive sensors" by Zui Tao, Philippe Bonnifait, Vincent Fremont, Javier Ibañez-Guzman, Intelligent Robots and Systems (IROS 2013); Nov. 2013; Tokyo, Japan. pp. 406-412, https://hal.archives-ouvertes.ff/hal-00880566/document.

(Continued)

*Primary Examiner* — Thomas G Black
*Assistant Examiner* — Matthias S Weisfeld
(74) *Attorney, Agent, or Firm* — Harness, Dickey & Pierce, P.L.C.

(57) ABSTRACT

A lane trace control system for maintaining a vehicle in its intended lane of travel. The system includes a lane trace control module configured to: compare the road information obtained by a lane recognition camera with map data obtained from a map module; determine a confidence level of the lane recognition camera based on a magnitude of any differences identified between the road information obtained from the lane recognition camera and the obtained map data; generate a target wheel angle for keeping the vehicle in its intended lane based entirely on the road information obtained from the lane recognition camera when the confidence level is above a predetermined threshold; and generate the target wheel angle based on a combination of the road information obtained from the lane recognition camera and the obtained map data of the road when the confidence level is below the predetermined threshold.

20 Claims, 2 Drawing Sheets

(56) References Cited

U.S. PATENT DOCUMENTS

Figure 1:
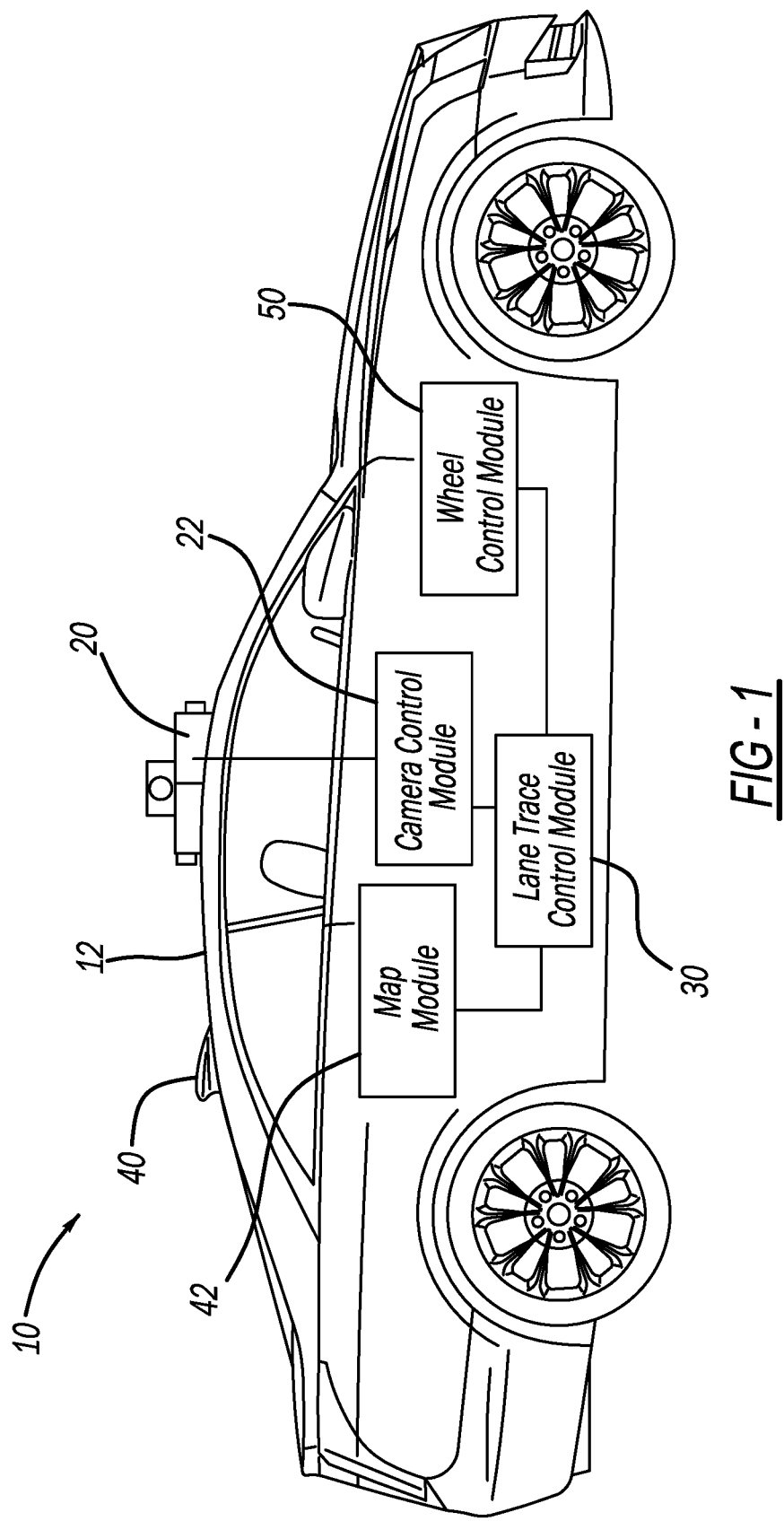

| | | | |
|---|---|---|---|
| 9,090,260 B2 | 7/2015 | Clarke et al. | |
| 9,224,050 B2 | 12/2015 | Elinas et al. | |
| 9,435,885 B2 | 9/2016 | Fritsch et al. | |
| 9,483,700 B1 | 11/2016 | Chen et al. | |
| 9,710,714 B2 | 7/2017 | Chen et al. | |
| 9,719,801 B1 | 8/2017 | Ferguson et al. | |
| 2011/0251749 A1 | 10/2011 | Schwarz et al. | |
| 2014/0236482 A1 | 8/2014 | Dorum et al. | |
| 2014/0257686 A1 | 9/2014 | Feldman et al. | |
| 2015/0307096 A1* | 10/2015 | Igarashi | G08G 1/096844 701/41 |
| 2016/0046290 A1* | 2/2016 | Aharony | B60W 10/20 701/41 |
| 2017/0262712 A1 | 9/2017 | Chundrlik, Jr. et al. | |
| 2017/0369057 A1 | 12/2017 | Gurghian et al. | |
| 2019/0113925 A1* | 4/2019 | Sim | B60W 30/18163 |
| 2020/0240806 A1* | 7/2020 | Daikoku | G08G 1/04 |

OTHER PUBLICATIONS

"On-Board Lane Detection System for Intelligent Vehicle Based on Monocular Vision" by Xiaodong Miao, Shunming Li, Huan Shen, International Journal on Smart Sensing and Intelligent Systems, vol. 5, No. 4, http://s2is.org/Issues/v5/n4/papers/paper13.pdf.

"Map-Based Lane and Obstacle-Free Area Detection" by T. Kowsari, S.S. Beauchemin, and M.A. Bauer, http://www.csd.uwo.ca/faculty/beau/PAPERS/visapp-14.pdf.

"Learning from Maps: Visual Common Sense for Autonomous Driving" by Ari Seff, Jianxiong Xiao, Computer Vision and Pattern Recognition, Dec. 7, 2016, https://arxiv.org/abs/1611.08583.

"A Reliable and Robust Lane Detection System Based on the Parallel Use of Three Algorithms for Driving Safety Assistance" by Raphael Labayrade, Jerome Douret, Jean Laneurit and Roland Chapuis, IEICE Transactions on Information and Systems vol. E89-D No. 7 pp. 2092-2100, Jul. 1, 2006, https://search.ieice.org/bin/summary.php?id=e89-d_7_2092.

"Lane Estimation for Autonomous Vehicles using Vision and LIDAR" by Albert S. Huang, Feb. 2010, http://rvsn.csail.mit.edu/Pubs/phd_ashuang_2010feb_laneestimation.pdf.

"TomTom HD map with road DNA," TomTom Automotive website, https://www.tomtom.com/automotive/automotive-solutions/automated-driving/hd-map-roaddna/.

"Lane Level Localization; Using Images and Hd Maps to Mitigate the Lateral Error" by Siavash Hosseinyalamdary, Michael Peter, The International Archives of the Photogrammetry, Remote Sensing and Spatial Information Sciences, vol. XLII-1/W1, 2017, Jun. 6-9, 2017, https://www.researchgate.net/publication/317308059_LANE_LEVEL_LOCALIZATION_USING_IMAGES_AND_HD_MAPS_TO_MITIGATE_THE_LATERAL_ERROR.

"Camera to Map Alignment for Accurate Low-Cost Lane-Level Scene Interpretation" by Gaoya Cao, Florian Damerow, Benedict Flade, Markus Helmling and Julian Eggert, 2016 IEEE 19th International Conference on Intelligent Transportation Systems (ITSC), Nov. 1-4, 2016; http://www.honda-ri.de/pubs/pdf/1167.pdf.

"Map-based Lane Detection and Driver Assist—A Final Project Report to Volvo Commercial Trucking" by Alexander Brown, Bobby Leary, David Corbin, Sean Brennan, Aug. 15, 2014, http://www.mautc.psu.edu/docs/PSU-2013-08.pdf.

"A Hybrid Vision-Map Method for Urban Road Detection" by Carlos Fernández, David Fernández-Llorca and Miguel A. Sotelo, Journal of Advanced Transportation, vol. 2017 (2017), Oct. 30, 2017, https://www.hindawi.com/journals/jat/2017/7090549/.

"Map-Aided Localization with Lateral Perception" by Dominique Gruyer, Rachid Belaroussi, and Marc Revilloud, Aug. 18, 2014, https://pdfs.semanticscholar.org/bbfd/d2a93cf68d0584ee861eff1b006b8751173d.pdf.

"Accurate vehicle self-localization in high definition map dataset" by Andi Zang, Zichen Li, David Doria, Goce Trajcevski, AutonomousGIS '17 Proceedings of the 1st ACM SIGSPATIAL Workshop on High-Precision Maps and Intelligent Applications for Autonomous Vehicles, Nov. 7-10, 2017, https://dl.acm.org/citation.cfm?id=3149092.3149094.

"Using High-Definition maps for precise urban vehicle localization" by Sven Bauer, Yasamin Alkhorshid and Gerd Wanielik, Intelligent Transportation Systems (ITSC), 2016 IEEE 19th International Conference, Dec. 26, 2016, Intelligent Transportation Systems (ITSC), 2016 IEEE 19th International Conference.

* cited by examiner

VEHICLE LANE TRACE CONTROL SYSTEM

FIELD

The present disclosure relates to a lane trace control system for maintaining a vehicle in a lane of travel.

BACKGROUND

This section provides background information related to the present disclosure, which is not necessarily prior art.

The number of vehicles with autonomous drive systems is increasing every year. Level two autonomous drive systems, which control vehicle steering and speed, typically include a lane trace control (LTC) system for keeping the vehicle in its intended lane of travel. While current LTC systems are suitable for their intended use, they are subject to improvement. For example, current LTC systems may experience reduced functionality under certain conditions and scenarios, such as at an entrance of a tunnel, at an exit of a tunnel, and during freeway merging. In addition, current LTC systems calculate confidence based only on data collected by a lane recognition camera, which is typically not accurate enough to determine true LTC performance. Thus with current LTC systems, the driver must be prepared to take control of the vehicle at all times because the confidence determination is not always helpful. The present disclosure advantageously provides for LTC systems and methods that address these issues in the art and provide numerous additional advantages as explained herein and as one skilled in the art will recognize.

SUMMARY

This section provides a general summary of the disclosure, and is not a comprehensive disclosure of its full scope or all of its features.

The present disclosure includes a lane trace control system for maintaining a vehicle in its intended lane of travel. The system includes a lane trace control module configured to: compare road information obtained by a lane recognition camera with map data obtained from a map module; determine a confidence level of the lane recognition camera based on a magnitude of any differences identified between the road information obtained from the lane recognition camera and the obtained map data; generate a target wheel angle for keeping the vehicle in its intended lane based entirely on the road information obtained from the lane recognition camera when the confidence level is above a predetermined threshold; and generate the target wheel angle based on a combination of the road information obtained from the lane recognition camera and the obtained map data of the road when the confidence level is below the predetermined threshold.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Figure 2:
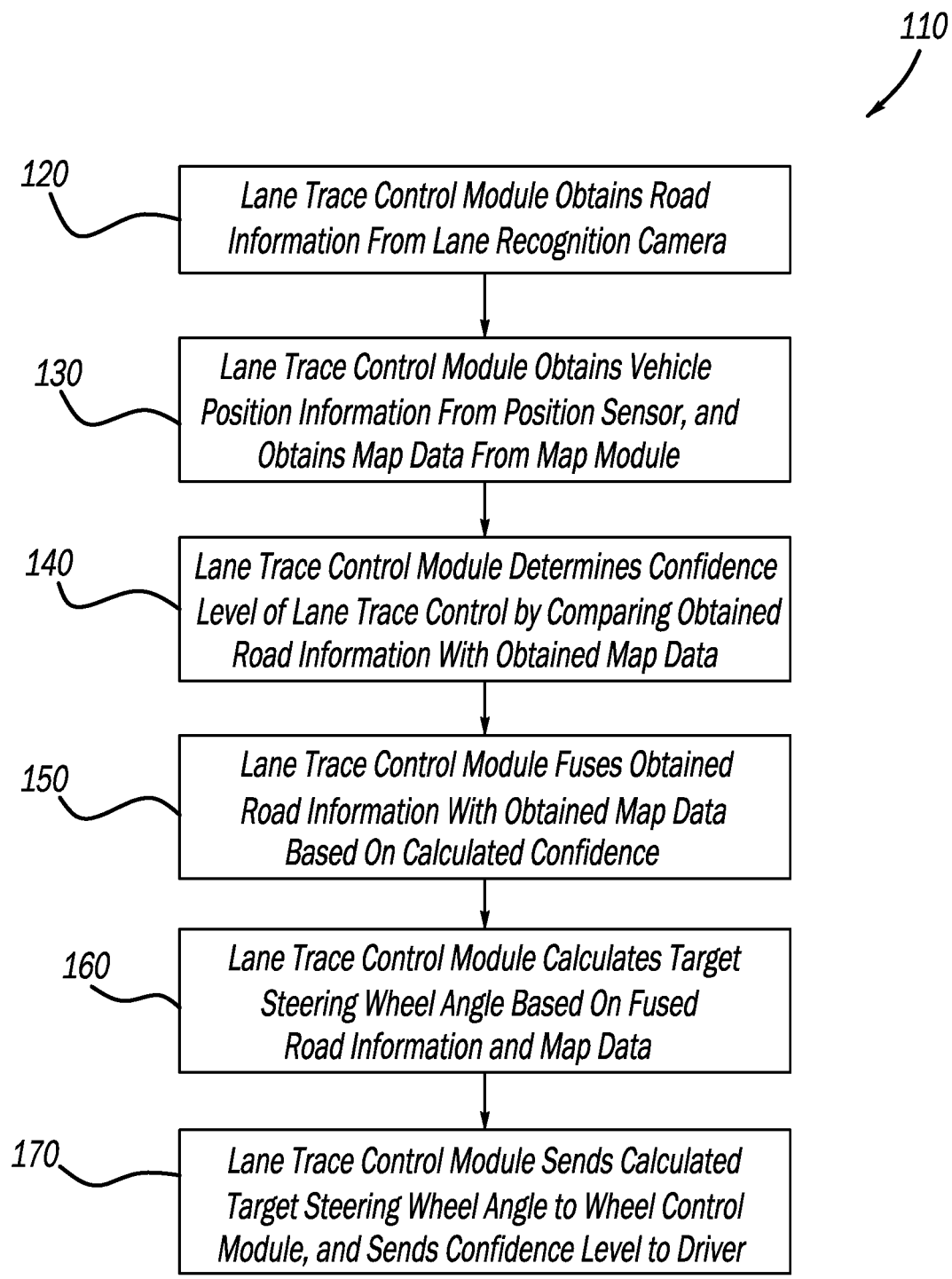

FIG. 1 illustrates a lane trace control (LTC) system in accordance with the present disclosure installed in an exemplary vehicle; and FIG. 2 illustrates a lane trace control (LTC) method in accordance with the present disclosure.

Corresponding reference numerals indicate corresponding parts throughout the several views of the drawings.

DETAILED DESCRIPTION

Example embodiments will now be described more fully with reference to the accompanying drawings.

FIG. 1 illustrates an exemplary lane trace control system in accordance with the present disclosure at reference numeral 10. The example of FIG. 1 illustrates the system 10 installed in an exemplary vehicle 12. Although the vehicle 12 is illustrated as an exemplary passenger vehicle, the system 10 may be included with any other suitable vehicle as well. Suitable vehicles include, but are not limited to, the following: mass-transit vehicles; recreational vehicles; utility vehicles; commercial vehicles; motorcycles; all-terrain vehicles; construction vehicles/equipment; military vehicles/equipment, etc.

In this application, including the definitions below, the term "module" may be replaced with the term "circuit." The term "module" may refer to, be part of, or include processor hardware (shared, dedicated, or group) that executes code and memory hardware (shared, dedicated, or group) that stores code executed by the processor hardware. The code is configured to provide the features of the modules, controllers, and systems described herein. The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The system 10 includes at least one camera 20 suitable for obtaining road information regarding the road that the vehicle 12 is traveling on. The road information includes, but is not limited to, the following: road curvature; offset distance of the vehicle from a center of the road and/or from a center of a lane of the road; lane marker location; radius of the lane; radius of the road; lane width; and yaw offset between the road and the vehicle. The camera 20 may be any suitable camera such as any suitable visual light camera. The camera 20 may also include or be combined with any other suitable sensors, such as Lidar, radar, sonar, etc.

The camera 20 is controlled by a camera control module 22. The camera control module 22 is in communication with a lane trace control module 30. The camera control module 22 inputs the road information obtained by the camera 20 to the lane trace control module 30 for processing thereby, as described herein.

The system 10 further includes any suitable position sensor for sensing the position of the vehicle 12 relative to the road that the vehicle 12 is traveling on. Any suitable sensors may be used, such as sensors associated with a GPS system including a GPS sensor/receiver 40. The location of the vehicle 12 obtained by the GPS receiver 40 and associated GPS system is input to a map module 42.

The map module 42 includes map data. Alternatively, the map module 42 may be in communication with map data stored remotely. The map data includes any suitable information regarding the road that the vehicle 12 is travelling upon. Exemplary map data included with, or accessible by, the map module 42 includes one or more of the following: road curvature; location of a center point of the road; locations of road lane markers and/or road boundary lines; radius of the lane; radius of the road; lane width; and yaw offset between the road and the vehicle. Based on the location of the vehicle 12 determined by the position sensor 40 and the map data of the map module 42, the location of the vehicle 12 relative to a center of the road can be determined. The map module 42 is in communication with the lane trace control module 30, and inputs the map data and the location of the vehicle 12 relative to the various data points of the road stored by (or accessible by) the map module 42 to the lane trace control module 30.

The lane trace control module 30 is configured to compare the road information obtained by the lane recognition camera 20 with map data obtained by the map module 42 (and the position of the vehicle 12 relative to the map data of the map module 42 as indicated by the position sensor 40), and identify any differences therebetween. The lane trace control module 30 further determines a confidence level of the lane recognition camera 20 based on the magnitude of any differences identified between the road information obtained from the lane recognition camera 20 and the map data from the map module 42. The confidence level may be a level on a scale of 0 to 100, for example. A confidence level of 100 represents full confidence in the road information obtained by the lane recognition camera 20 as being completely accurate and reliable for being solely relied on to maintain the vehicle 12 in its intended lane. A confidence level of 0 represents no confidence in road information collected by the lane recognition camera 20, and/or an inoperable lane recognition camera 20. A confidence level of 50 indicates an intermediate or average confidence level in the road information obtained by the lane recognition camera 20. A confidence level between 50 and 100 indicates greater than an intermediate or average level of confidence in data from the lane recognition camera 20. A confidence level of less than 50 indicates less than an intermediate or average level of confidence.

When the confidence level is at 100, or within a predetermined range from 100 (e.g., within a range of 90-100), the lane trace control module 30 generates a target wheel angle of the wheels (e.g., the front wheels) of the vehicle 12 suitable for maintaining the vehicle 12 in its intended road lane based entirely on the road information obtained from the lane recognition camera 20. Conversely, when the confidence level is below the predetermined threshold range, such as below 90 and above 10 for example, the lane trace control module 30 generates the target wheel angle based on a combination of the road information obtained by the lane recognition camera 20 and the obtained map data (and position of the vehicle 12 obtained by the position sensor 40 overlaid on the map data). The weight given to the road information obtained by the lane recognition camera 20 is generally proportional to the confidence level determined by the lane trace control module 30. Thus the higher the confidence level, the greater the weight assigned to the road information obtained by the lane recognition camera 20, and the less weight assigned to the map data from the map module 42.

At lower confidence levels, such as below 50 for example, generally more weight is given to the map data from the map module 42 than to the road information obtained by the lane recognition camera 20. However, the map data of the map module 42 is also assigned a confidence level as well. Some map data may have a lower confidence level than other map data. For example, map data associated with a curvature of a lightly traveled backroad will typically have a lower confidence level than map data associated with an interstate highway, in particular a straight stretch of interstate highway that is heavily traveled. Thus, for example, when the lane trace control module 30 assigns a confidence level of 40 to road information obtained by the lane recognition camera 20, the lane trace control module 30 will place a less than fifty percent weight on the road information from the lane recognition camera 20 when the corresponding map data of the map module 42 has been assigned a relatively high reliability level. Conversely, if the map data of the map module 42 has been assigned a relatively low reliability level, the lane trace control module 30 will place a greater weight on the road information obtained by the lane recognition camera 20 as opposed to the map data of the map module 42 even when the road information from the camera 20 has a confidence level of less than 50, such as 40 for example.

Based on the lane trace control module's 30 fusion of the road information obtained by the lane recognition camera 20 and the map data from the map module 42, which is fused at relative weights based on the confidence level, the lane trace control module 30 generates a target wheel angle for keeping the vehicle 12 in its intended lane of travel. If the confidence level is below or above predetermined thresholds, as described above, the lane trace control module will generate the target wheel angle based solely on the map data from the map module 42, or entirely on the road information from the camera 20. The lane trace control module 30 inputs the target wheel angle to a wheel control module 50. The wheel control module 50 sets the wheels of the vehicle 12 at the target wheel angle to maintain the vehicle 12 in its intended lane of travel.

The lane trace control module 30 is further configured to generate the target wheel angle based on a combination of the map data of the map module 42 and historical road information regarding the road that the vehicle 12 is traveling upon previously captured using the lane recognition camera 20 of the vehicle 12 (or a lane recognition camera of another vehicle, which may be stored in the system 10 or downloaded to the system 10) when the confidence level is below a predetermined threshold (such as below 10, for example), and is thus generally unreliable. The lane trace control module 30 is configured to determine that the road information obtained from the lane recognition camera 20 is unreliable upon detecting, for example, erratic changes in the road information obtained by the camera 20. Exemplary erratic changes include, but are not limited to, sudden curvature/offset value changes or loss of data, or a large discrepancy between road information from the camera 20 and map data of the map module 42.

The lane trace control module 30 generates any suitable notification to a driver of the vehicle 12 notifying the driver of the confidence level in the road information obtained by the lane recognition camera 20. This advantageously allows the driver to monitor the effectiveness of the lane recognition camera 20. The driver can be thus prepared to possibly have to take control of the vehicle 12 from an autonomous drive system including the lane trace control system 10 in instances where the confidence level is low and possibly decreasing.

FIG. 2 illustrates an exemplary lane trace control method 110 in accordance with the present disclosure for maintaining the vehicle 12 in its intended lane of travel. The method 110 may be performed by the system 10 of FIG. 1, or any other suitable system. Thus the following description of the method 110 as being performed by the system 10 is provided for exemplary purposes only.

At block 120 of the method 110, the lane trace control module 30 obtains road information from the lane recognition camera 20. The road information may be any suitable road information of the road that the vehicle 12 is traveling upon, such as, but not limited to, the following: road curvature and offset distance of the vehicle 12 from the center of the road; the location of the lane markers on the road; radius of the lane; radius of the road; lane width; and yaw offset between the road and the vehicle 12. The lane trace control module 30 obtains the road information from the camera 20 by way of the camera control module 22. At block 130 of the method 110, the lane trace control module 30 obtains vehicle position information from the position sensor 40 (GPS receiver, for example) and obtains map data of the road that the vehicle 12 is traveling upon from the map module 42.

At block 140 of the method 110, the lane trace control module 30 determines the confidence level of the road information from the camera 20 by comparing the road information from the camera 20 with the map data from the map module 42 and the position of the vehicle 12 relative to the map data based on position information from the position sensor 40. The confidence level is determined by the lane trace control module 30 at block 140 in the same manner described above in conjunction with the description of the lane trace control module 30 and the system 10.

At block 150, the lane trace control module 30 fuses the road information obtained from the lane recognition camera 20 with the map data of the map module 42 based on the confidence level. Thus as described above, the weight of the road information from the camera 20 versus the weight of the map data of the map module 42 varies based on (and is proportionate to) the confidence level of the camera 20 and the confidence level of the map data of the map module 42.

At block 160, the lane trace control module 30 determines a target wheel angle of the wheels of the vehicle 12 based on the road information from the camera 20 and/or the map data of the map module 42. From block 160 the method 110 proceeds to block 170, at which the lane trace control module sends the target steering wheel angle to the wheel control module 50. The wheel control module 50 is in cooperation with the wheels of the vehicle 12, and rotates the wheels to the target steering wheel angle to maintain the vehicle 12 in its intended lane of travel. At block 170, the lane trace control module 30 also sends the confidence level to the driver for the driver to monitor. Based on the confidence level, the driver will advantageously know when the lane recognition camera 20 is unable to obtain accurate road information and/or is not functioning optimally, so that the driver can be prepared to take manual control of the vehicle 12 from an autonomous drive system including the lane trace control system 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A lane trace control (LTC) method for maintaining a vehicle in its intended lane of travel, the method comprising:
   obtaining road information regarding a road that the vehicle is traveling on using a lane recognition camera;
   obtaining vehicle position information using a position sensor;
   obtaining map data of the road that the vehicle is traveling on from a map module based on the vehicle position obtained using the position sensor;
   determining a map reliability level of the map data based on a historical traffic level of the road;
   comparing, with a lane trace control module, the road information obtained from the lane recognition camera with the map data obtained from the map module, and identifying any differences therebetween with the lane trace control module;
   determining, with the lane trace control module, a confidence level of the lane recognition camera based on a magnitude of any differences identified between the road information obtained from the lane recognition camera and the obtained map data;
   generating, with the lane trace control module, a target wheel angle of wheels of the vehicle for keeping the vehicle in its intended lane based entirely on the road information obtained from the lane recognition camera when the confidence level is above a predetermined threshold; and
   generating, with the lane trace control module, the target wheel angle based on a combination of the road information obtained from the lane recognition camera and the obtained map data of the road when the confidence level is below the predetermined threshold, the map data given relatively more weight in the combination when the map reliability level is relatively high, and the map data given relatively less weight in the combination when the map reliability level is relatively low.

2. The method of claim 1, wherein the road information obtained using the lane recognition camera includes road curvature and offset distance of the vehicle from a center of the road; and
   wherein the map data obtained of the road and the vehicle position information includes road curvature and offset distance of the vehicle from the center of the road.

3. The method of claim 2, wherein the road information obtained using the lane recognition camera further includes at least one of lane marker location, radius of lane, radius of road, lane width, and yaw offset between the road and the vehicle; and
   wherein the map data further includes at least one of lane marker location, radius of lane, radius of road, lane width, and yaw offset between the road and the vehicle.

4. The method of claim 1, further comprising:
   inputting, with the lane trace control module, the target wheel angle to a wheel control module, and setting the wheels of the vehicle with the wheel control module at the target wheel angle to maintain the vehicle in its intended lane of travel.

5. The method of claim 1, wherein the position sensor includes a global positioning sensor.

6. The method of claim 1, further comprising generating, with the lane trace control module, the target wheel angle based on only the obtained map data of the road when the road information obtained with the lane recognition camera is unreliable.

7. The method of claim 1, further comprising:
   when the confidence level is below the predetermined threshold such that the road information obtained from the lane recognition camera is unreliable, generating with the lane trace control module the target wheel angle based on a combination of the obtained map data of the road and historical road information regarding the road captured by the lane recognition camera or another camera.

8. The method of claim 7, wherein the lane trace control module determines the road information obtained from the lane recognition camera to be unreliable upon detecting erratic changes in the obtained road information from the lane recognition camera.

9. The method of claim 1, wherein the road information obtained from the lane recognition camera is unavailable, generating with the lane trace control module the target wheel angle based on a combination of the obtained map data of the road and historical road information regarding the road captured by the lane recognition camera or another camera.

10. The method of claim 1, wherein the lane trace control module further generates a notification to a driver of the vehicle notifying the driver of the confidence level.

11. A lane trace control (LTC) system for maintaining a vehicle in its intended lane of travel, the system comprising:
    a lane recognition camera configured to obtain road information regarding a road that the vehicle is traveling on;
    a position sensor configured to obtain vehicle position information of the vehicle;
    a map module including map data of the road that the vehicle is traveling on;
    a lane trace control module configured to:
      compare the road information obtained by the lane recognition camera with the map data obtained from the map module and position of the vehicle relative to the map data, and identify any differences therebetween;
      determine a map reliability level of the map data based on a historical traffic level of the road;
      determine a confidence level of the lane recognition camera based on a magnitude of any differences identified between the road information obtained from the lane recognition camera and the obtained map data;
      generate a target wheel angle of wheels of the vehicle for keeping the vehicle in its intended lane based entirely on the road information obtained from the lane recognition camera when the confidence level is above a predetermined threshold; and
      generate the target wheel angle based on a combination of the road information obtained from the lane recognition camera and the obtained map data of the road when the confidence level is below the predetermined threshold, the map data given relatively more weight in the combination when the map reliability level is relatively high, and the map data given relatively less weight in the combination when the map reliability level is relatively low.

12. The LTC system of claim 11, wherein the lane recognition camera is configured to obtain road information including road curvature and offset distance of the vehicle from a center of the road; and wherein the map data includes road curvature and offset distance of the vehicle from the center of the road.

13. The LTC system of claim 12, wherein the lane recognition camera is further configured to obtain road information including at least one of lane marker location, radius of lane, radius of road, lane width, and yaw offset between the road and the vehicle; and wherein the map data further includes at least one of lane marker location, radius of lane, radius of road, lane width, and yaw offset between the road and the vehicle.

14. The LTC system of claim 11, further comprising a wheel control module configured to set the wheels of the vehicle at the target wheel angle to maintain the vehicle in its intended lane of travel.

15. The LTC system of claim 11, wherein the position sensor includes a global positioning sensor.

16. The LTC system of claim 11, wherein the lane trace control module is further configured to generate the target wheel angle based on only the obtained map data of the road when the road information obtained with the lane recognition camera is unreliable.

17. The LTC system of claim 16, wherein the lane trace control module is configured to determine that the road information obtained from the lane recognition camera is unreliable upon detecting erratic changes in the obtained road information.

18. The LTC system of claim 11, wherein the lane trace control module is configured to generate the target wheel angle based on a combination of the obtained map data of the road and historical road information regarding the road captured using the lane recognition camera or another camera when the confidence level is below the predetermined threshold.

19. The LTC system of claim 11, wherein the lane trace control module is configured to generate the target wheel angle based on a combination of the obtained map data of the road and historical road information regarding the road captured using the lane recognition camera when the road information obtained from the lane recognition camera is unavailable.

20. The LTC system of claim 11, wherein the lane trace control module is configured to generate a notification to a driver of the vehicle notifying the driver of the confidence level.

* * * * *